United States Patent

[11] 3,596,914

[72] Inventor Sakae Fujimoto
Tokyo, Japan
[21] Appl. No. 797,511
[22] Filed Feb. 7, 1969
[45] Patented Aug. 3, 1971
[73] Assignee Kabushiki Kaisha Ricoh
Tokyo, Japan
[32] Priority Feb. 16, 1968
[33] Japan
[31] 43/11,317

[54] SPIRAL-TYPE MAGNETIC RECORDING AND PLAYBACK HEAD DRIVE DEVICE
4 Claims, 3 Drawing Figs.

[52] U.S. Cl. .......... 274/4
[51] Int. Cl. .......... G11b 5/82, G11b 21/04
[50] Field of Search .......... 274/4, 11, 13

[56] References Cited
UNITED STATES PATENTS

| | | | |
|---|---|---|---|
| 3,000,638 | 9/1961 | Dennis | 274/4 (.1) |
| 3,210,082 | 10/1965 | Murata | 274/4 (.1) |
| 3,214,175 | 10/1965 | Nakamatsu | 274/4 (.2) |
| 3,322,427 | 5/1967 | Fujimoto | 274/4 (.2) |
| 3,369,813 | 2/1968 | Nagashima et al. | 274/13 X |

*Primary Examiner*—Harry N. Haroian
*Attorney*—Burgess, Ryan and Hicks

ABSTRACT: A spiral-type magnetic recording and playback head drive device, wherein the head is driven by an assembly composed of a rack and spiral grooves formed coaxially of the axis of rotation of the head for engagement with the teeth of the rack. Upon completion of recording or playback, the rack is disengaged and returned to its initial position; and concurrently the head is spaced apart from a magnetic sheet while the head is returned to its normal position.

INVENTOR

SAKAE FUJIMOTO

BY Burgess, Ryan & Hicks
ATTORNEYS

SPIRAL-TYPE MAGNETIC RECORDING AND PLAYBACK HEAD DRIVE DEVICE

BACKGROUND OF THE INVENTION

The present invention relates to a magnetic recording and reproduction device, and more particularly a drive device for driving a magnetic recording and playback head.

The general appearance of a conventional spiral-type magnetic recording and reproduction device is shown in FIG. 1. A large circular aperture is formed in the top plate of a casing 1 in the form of a box, and a rotary disk 3 is disposed in the circular aperture for rotation therein at a level slightly lower than the top plate. The rotary disk 3 has radial groove 4 formed from the outer periphery thereof and through this groove 4 is disposed a recording and playback head 7 which is carried upon a securing plate 21 so as to have a tendency of moving upwardly by means of a spring. This securing plate 21 in turn is fixedly secured upon a sliding plate 6 which is radially slidably disposed upon a lower rotary disk 5 which is disposed coaxially of and connected with the rotary disk 3. A recording or reproduction sheet 8 is placed stationarily upon the top plate with the recording side of the sheet 8 facing toward the top plate, and a transparent plate 9 one side edge of which is hinged to one side edge of the casing is clamped over the sheet 8. After preparation for recording or reproduction as described above, a suitable starting button is depressed so that the head rotates about the center axis of the rotary disk in contact with the recording sheet and concurrently moves gradually toward the center of the rotary disk along the groove 4 for recording or reproduction. The structure and function of the device of the type described above is well known in the art.

In addition to the fundamental function of the device of the type described above, the device is provided with various other additional functions. For example, the device functions such that when the head reaches a predetermined position in the vicinity of the center upon completion of recording or reproduction, the head is automatically returned to its initial position and the rotary disks stop upon returning of the head to its initial position. Alternatively, the device functions such that a desired recorded portion of the magnetic sheet may be repeatedly reproduced as many times as desired for study or other purposes. In all cases, in order to provide desirable additional functions to the device of the type described the arrangement must be such that when the head is retracted outwardly along the groove 4, the head must not be in sliding contact with the magnetic sheet, that is the head must be spaced apart from the recording sheet against the tendency of the head of moving upwardly. In this case, the operation of lowering the head below the magnetic sheet must be interlocked with the operation of the mechanism for returning radially the head to its initial position so that the head will never be returned outwardly radially to its initial position with the head remaining moved upwardly, that is with the head remaining in contact with the recording sheet.

In view of the above, one of the objects of the present invention is to provide a drive mechanism for a head of the type described which is simple in construction and permits the movement of the head in the radial direction upon the rotary disk.

SUMMARY OF THE INVENTION

According to one of the features of the present invention, the drive of a recording and playback head is effected by means of a rack and spiral grooves formed upon the peripheral edge of a saucer like flange disposed coaxially of the center of rotation of said head, the teeth of said rack releasably engaging with said spiral grooves. That is, the head is fixedly secured to a member which is adapted to slide together with the rack in the same direction so that when the rack is advanced, the head is also advanced toward the center of rotation of the head while the head remains in contact with the surface of the recording sheet.

Upon completion of recording or reproduction the rack is raised up for disengagement with the spiral groove and the rack is returned to its initial position together with the head. When the rack is raised, the head is automatically spaced apart from the recording sheet so that there will be no fear at all that the head remains in slidable contact with the recording sheet while the head is returned to its initial position.

The above and other objects, advantages and features of the present invention will become apparent from the following description taken in conjunction with the accompanying drawings.

DESCRIPTION OF PREFERRED EMBODIMENT

Figure 2:
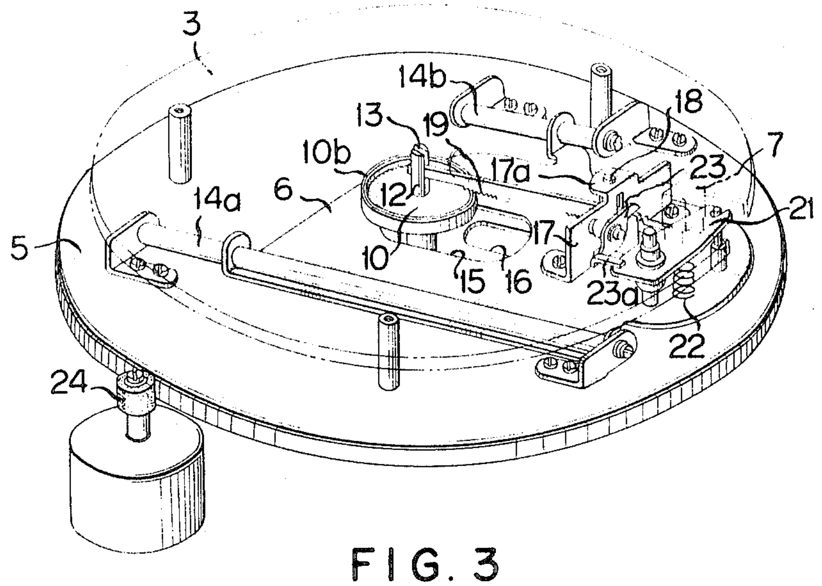
FIG. 2 is a perspective view illustrating only the essential parts of a recording and reproduction head drive mechanism of the present invention for use in the device shown in FIG. 1.
Figure 3:
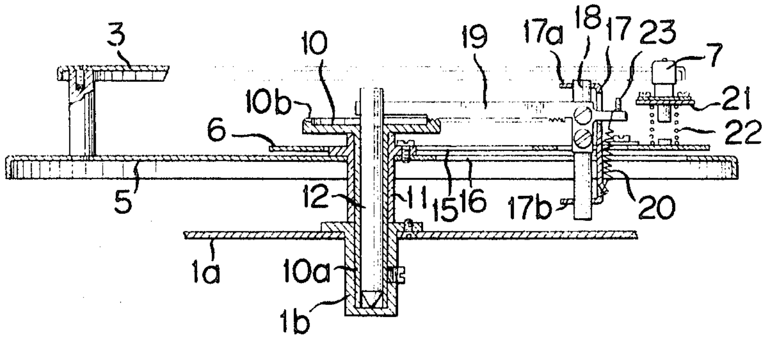
FIG. 3 is a longitudinal sectional view taken along the plane including a rack of FIG. 2.

In the main body of a box-type recording device according to the present invention is disposed an intermediate shelf or plate 1*a* stationarily and horizontally as shown in FIG. 3. Into a tubular bearing 1*b* fixedly secured to the intermediate shelf or plate 1*a* is fitted coaxially of the bearing 1*b* the lower end portion of a tubular or hollow shaft 10*a* having a flanged portion 10 formed in the shape of a saucer at the upper portion of the hollow shaft 10*a*. A sleeve 11 is loosely fitted over the hollow shaft 10*a* coaxially thereof and has a flanged portion which is overlaid upon the peripheral portion of a center aperture of the lower rotary disk 5 described with reference to FIG. 2 and connected therewith by means of rivets. By means of equiangularly disposed three posts extending upwardly from the rotary disk 5 the upper rotary disk is attached thereto in coaxial relation. A center shaft or spindle 12 if fitted into the hollow shaft 10*a* and has a slit 13 extending longitudinally thereof at its upper end (see FIG. 2). The upper portion of the central shaft or spindle 12 is extended by a suitable distance beyond the center aperture of the flange 10 formed integrally at the top of the hollow shaft 10*a*. The width of the upright peripheral portion of the flange 10 is such that a few turns or coils of a spiral groove 10*b* may be formed. The spiral grooves are coaxial of the shaft or spindle 12.

Upon a pair of parallel guide rods 14*a* and 14*b* horizontally disposed upon the rotary disk 5 is slidably carried the plate 6 through a plurality of (apertured) lug or ear elements extending therefrom. Since the hollow shaft 10*a* and the sleeve 11 fitted therearound are both extended upwardly through the sliding plate 6, a slot 15 is formed in the sliding plate 6 in the direction of sliding motion thereof so that it is not prevented from its sliding motion by the above hollow shaft 10*a* and the sleeve 11. A relatively long slot 16 is formed in the rotary disk 5 in parallel with the slot 15. A small securing plate 17 is disposed upon the sliding plate 6 along the extension of the longitudinal axis of the slot 15. As shown in FIG. 3 the securing plate 17 is provided with an ear element 17*a* formed at a portion of the upper side edge of the securing plate 17 and a lower ear element 17*b* extending from the lower side edge of a depending element which extends from the lower side edge of the securing plate 17 through the slot 16 beyond the undersurface of the rotary disk 5. A longitudinal shaft 18 is supported vertically slidably by these ear elements 17*a* and 17*b*, and a rack 19 fixedly secured to the shaft 18 at a right angle thereto in such a manner that the toothed portion of the rack 19 is directed downwardly. A relatively strong compression spring 20 is loaded between a portion of the rack 19 and a suitable portion of the depending element of the securing plate 17 so that the shaft 18 and the rack 19 attached thereto are imparted with a tendency to move downwardly but this tendency is limited by the engagement of the saw-shaped teeth of the rack 19 with the spiral grooves 10*b* formed at the upper surface of the peripheral edge portion of the flange 10. One end of the rack 19 is loosely fitted in the slit 13 at the top portion of the shaft 12 extending from the center of the flange 10 while the other end of the rack 19 extends through a longitudinal slot formed in the securing plate 17 and beyond thereof by a suitable distance.

A small securing plate 21 carrying the recording and playback head 7 is disposed upon the sliding plate 6 in such a manner that the securing plate 21 has a tendency of moving upwardly by means of a longitudinal guide rod and a relatively weak extension spring 22. A lever 23 is pivotably carried by a lateral shaft extending from the outer side surface of the securing plate 17 as best shown in FIG. 2 and one arm of the lever 23 rides over the rack 19. The other arm of the lever 23 extends horizontally to a projection 23*a* so that the tendency of upward movement of the securing plate 21 and the head 7 carried thereby is limited to a predetermined extent. As shown in FIG. 2, around the peripheral surface of the turntable 5 is pressed a friction roller 24 driven by an electric motor.

Figure 1:
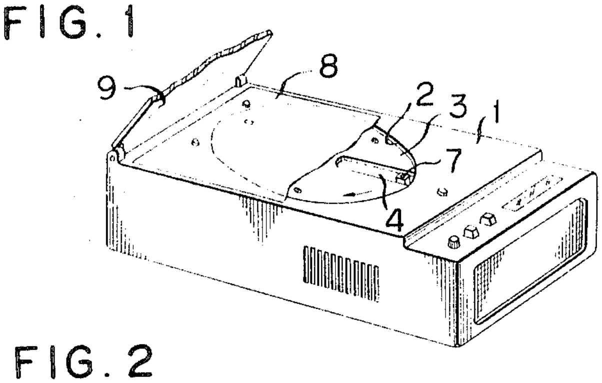
FIG. 1 is a perspective view of a spiral-type magnetic recording and reproduction device.

When the recording and playback head 7 is located in the slot 4 at a suitably upwardly biased initial position in the proximity of the outer peripheral edge of the rotary disk 3 as shown in FIG. 1 and the sheet 8 in which magnetic recording is made along the spiral paths is placed in predetermined position over the top of the recording device by means of suitable rulers, the head 7 is lightly pressed against the undersurface of the sheet 8 at the starting point located outwardly thereof upon closing the cover plate 9. Thereafter, the motor is driven so that the friction roller 24 shown in FIG. 2 rotates, whereby the rotary disk 3 rotates together with the rotary disk 5 about the flange 10. Consequently, the rack 19 and the central shaft or spindle 12 into whose slit is fitted the one end of the rack 19 rotate in the same direction about the axis of the rotary disk. Since the flange 10 remains stationary, the rack 19 which engages with the spiral grooves 10*b* upon the peripheral edge of the flange 10 advances toward the center of the flange 10 in the longitudinal direction of the rack 19 while rotating about the flange 10. Since the rack 19 is supported upon the sliding plate 6 through the securing plate 17, the sliding plate 6 and the head 7 carried thereby are caused to move toward the center of the flange 10 through the guide rods 14*a* and 14*b* upon the rotary disk 5. Consequently the locus of the motion of the head is a spiral having a predetermined pitch and follows inwardly the spiral tracks of the recording sheet for recording or playback.

When the recording or playback is effected in such a manner as described above, the longitudinal shaft 18 is caused to move toward a predetermined inner position. Then, a cam having an inclined cam profile pushes the shaft 18 upwardly against the spring 20 so that the rack 19 which is connected with the shaft 18 is caused to rise and disengage the teeth thereof from the spiral grooves 10*b* formed upon the surface of the peripheral edge of the flange 10. At this instant, by means of a mechanism for reversing the rack, the rack 19 is immediately returned to its outward initial position, and the rotary disks 3 and 5 are stopped when they are returned to their initial positions. Since the rack 19 is raised against the spring 20 during the returning operation, the other end of the rack 19 causes the lever 23 to rotate in the counterclockwise direction so that the projection 23*a* of the lever 23 pushes down the securing plate 21 together with the head 7 carried thereby against the spring 22, thereby spacing apart the head 7 from the magnetic recording sheet and preventing the head 7 from damaging the sheet.

According to the present invention, the principal assembly of the head drive device is comprised of a stationary flange in the shape of a saucer having a few spiral grooves formed upon the peripheral edge thereof and a rack for detachably engagement with those spiral grooves so that the assembly is simple in construction and easy to fabricate. Furthermore, the head device of the present invention can be easily mechanically and drivingly incorporated with a mechanism for lowering or spacing the head apart from the magnetic recording sheet when the head is returned to its initial position in the direction of the reverse movement of the rack.

The present invention has been so far described with particular reference to the preferred embodiments thereof, but it will be understood that variations and modifications can be effected without departing the true spirit of the present invention as described hereinabove and as defined in the appended claim.

I claim:

1. A spiral-type magnetic recording and playback head drive device comprising:
 a rotary drive;
 a lower disk in driven contact with said drive;
 an upper disk having a slot therein and spaced from said lower disk and attached thereto, said upper disk adapted to have a recording sheet placed therein;
 a plate located between said upper and lower disks and associated with said lower disk for rotation therewith, said plate mounted for slidable movement with respect to said lower disk;
 a fixed element extending upwardly through a centrally located aperture in said lower disk and terminating between said upper and lower disks, said fixed element having a saucer-shaped flange formed at its upper end including an upwardly facing peripheral lip having spiral grooves formed thereon:
 a rack element mounted on said slidable plate and extending longitudinally between said upper and lower disks, said rack element having a toothed portion formed on a downwardly facing edge and being biased into engagement with said spiral grooves;
 a recording and playback head having mounting means located to be slidably movable with said slidable plate, said head positioned between said upper and lower disks and being vertically displaceable within a predetermined distance, said head being biased upwardly to partially extend through the slot in said upper disk to contact the recording sheet; and
 pivoted lever means mounted on said slidable plate and positioned to have one end of said lever means in contact with said rack element and the other end of said lever means in contact with said head-mounting means whereby vertical upward movement of said rack element overcomes the engaging bias and disengages said toothed portion and rotates said lever means to withdraw said head against the head bias downwardly from the slot out of engagement with the recording sheet.

2. A spiral-type magnetic recording and playback head drive device according to claim 1 in which said fixed element is hollow and a rotatable shaft is mounted therein with its upper end terminating between said upper and lower disks, said upper end having a slit formed therein to supportingly receive an end of said rack element.

3. A spiral-type magnetic recording and playback head drive device according to claim 2 in which a securing plate is mounted on said sliding plate and includes an opening for the other end of said rack element to pass therethrough, and said lever means is mounted on said securing plate.

4. A spiral-type magnetic recording and playback head drive device according to claim 1 in which said head-mounting means comprises a horizontally disposed plate located between said upper and lower disks with a spring positioned between said horizontal plate and said lower disk to provide the bias, and said lower end of said lever means is in contact with the upper side of said horizontal plate.